United States Patent
Bendersky et al.

(10) Patent No.: US 12,417,356 B2
(45) Date of Patent: Sep. 16, 2025

(54) LARGE-SCALE, PRIVACY PRESERVING PERSONALIZED LARGE LANGUAGE MODELS (LLMS)

(71) Applicant: Google LLC, Mountain View, CA (US)

(72) Inventors: Michael Bendersky, Cupertino, CA (US); Mingyang Zhang, San Jose, CA (US)

(73) Assignee: Google LLC, Mountain View, CA (US)

( * ) Notice: Subject to any disclaimer, the term of this patent is extended or adjusted under 35 U.S.C. 154(b) by 253 days.

(21) Appl. No.: 18/325,934

(22) Filed: May 30, 2023

(65) Prior Publication Data
US 2024/0403564 A1  Dec. 5, 2024

(51) Int. Cl.
*G06F 40/35* (2020.01)
*G06N 20/00* (2019.01)

(52) U.S. Cl.
CPC ............ *G06F 40/35* (2020.01); *G06N 20/00* (2019.01)

(58) Field of Classification Search
CPC ....... A61B 5/024; G06F 16/22; G06F 16/345; G06F 16/90332; G06F 40/20; G06F 40/253; G06F 40/30; G06F 40/35; G06F 40/40; G06F 40/44; G06F 9/451; G06F 16/24575; G06F 16/9024; G06F 40/284; G06N 3/045; G06N 3/09; G06N 20/00; G06N 3/0442; G06N 3/0455; G10L 13/08; G10L 15/16; G10L 15/183; G06Q 30/02; G06Q 30/0601; G06Q 50/01; G06V 20/68; H04L 51/02
See application file for complete search history.

(56) References Cited

U.S. PATENT DOCUMENTS

| | | | |
|---|---|---|---|
| 6,446,064 B1* | 9/2002 | Livowsky | G06Q 30/02 707/999.005 |
| 11,694,281 B1* | 7/2023 | Liu | G06F 40/30 704/9 |
| 11,748,575 B2* | 9/2023 | Singh Bawa | G06F 16/24575 707/723 |
| 2008/0294637 A1* | 11/2008 | Liu | G06Q 30/0601 705/26.1 |

(Continued)

OTHER PUBLICATIONS

Brian Lester et al: "The Power of Scale for Parameter-Efficient Prompt Tuning", arxiv.org, Cornell University Library, 201 Olin Library Cornell University Ithaca, NY 14853, Sep. 2, 2021 (Sep. 2, 2021), XP091046212.

(Continued)

*Primary Examiner* — Gerald Gauthier
(74) *Attorney, Agent, or Firm* — Honigman LLP; Brett A. Krueger; Grant Griffth

(57) ABSTRACT

A method for providing personalized responses to textual prompts using a large scale, privacy preserving, large language model (LLM) includes receiving a textual prompt from a user specifying a task for an LLM to perform, and obtaining a set of user features associated with the user. The method also includes determining, using the set of user features associated with the user, a user prompt embedding for the user, and processing, using the LLM, the textual prompt conditioned on the user prompt embedding for the user to generate a personalized response to the textual prompt. The method further includes providing the personalized response to the textual prompt for output from a user device associated with the user.

28 Claims, 8 Drawing Sheets

(56) References Cited

U.S. PATENT DOCUMENTS

| | | | | |
|---|---|---|---|---|
| 2015/0228279 | A1 | 8/2015 | Biadsy et al. | |
| 2016/0062988 | A1* | 3/2016 | Allen | G06F 40/284 |
| | | | | 704/9 |
| 2019/0147043 | A1* | 5/2019 | Moskowitz | A61B 5/165 |
| | | | | 704/9 |
| 2021/0149937 | A1* | 5/2021 | Coulombe | G06F 40/253 |
| 2023/0090023 | A1* | 3/2023 | Gupta | G06F 16/90332 |
| | | | | 707/732 |
| 2023/0316006 | A1* | 10/2023 | Tunstall-Pedoe | G06N 3/0442 |
| | | | | 704/9 |
| 2023/0409615 | A1* | 12/2023 | Khemka | G06V 20/68 |
| 2024/0037163 | A1* | 2/2024 | Parker | G06F 9/451 |
| 2024/0062016 | A1* | 2/2024 | Tong | G06F 40/20 |
| 2024/0119932 | A1* | 4/2024 | Khorshid | G06Q 50/01 |
| 2024/0143932 | A1* | 5/2024 | Pandita | G06F 40/44 |
| 2024/0144922 | A1* | 5/2024 | Pandita | G10L 15/183 |
| 2024/0203404 | A1* | 6/2024 | Shabat | G10L 15/16 |
| 2024/0256792 | A1* | 8/2024 | Maschmeyer | G06F 40/40 |
| 2024/0281668 | A1* | 8/2024 | Lev | G06F 40/35 |
| 2024/0333746 | A1* | 10/2024 | Williams | H04L 51/02 |
| 2024/0347058 | A1* | 10/2024 | Rossi | G10L 13/08 |
| 2024/0354514 | A1* | 10/2024 | Valstar | A61B 5/024 |
| 2024/0354641 | A1* | 10/2024 | Miller | G06N 3/045 |
| 2024/0362417 | A1* | 10/2024 | Imani | G06N 3/09 |
| 2024/0362497 | A1* | 10/2024 | Grenader | G06F 16/22 |
| 2024/0378399 | A1* | 11/2024 | Gandhi | G06F 16/345 |
| 2024/0386015 | A1* | 11/2024 | Crabtree | G06F 16/9024 |
| 2024/0403564 | A1* | 12/2024 | Bendersky | G06F 40/30 |
| 2025/0036866 | A1* | 1/2025 | Tunstall-Pedoe | G06F 40/20 |

OTHER PUBLICATIONS

Saket Dingliwal et al: "Domain Prompts: Towards memory and compute efficient domain adaptation of ASR systems", arxiv.org, Cornell University Library, 201 Olin Library Cornell University Ithaca, NY 14853, Dec. 16, 2021 (Dec. 16, 2021), XP091120517.
International Search Report and Written Opinion issued in related PCT Application No. PCT/US2024/031508, dated Aug. 29, 2024.

* cited by examiner

LARGE-SCALE, PRIVACY PRESERVING PERSONALIZED LARGE LANGUAGE MODELS (LLMS)

TECHNICAL FIELD

This disclosure relates to large-scale, privacy preserving large language models.

BACKGROUND

Large language models (LLMs) that generate text in response to a user input are becoming increasingly popular as generative artificial intelligence (AI) grows in popularity. Certain LLMs are trained to provide generic template responses, however these responses fall short of incorporating context of the user, and instead provide the same output to all users. While including context into an LLM prompt may assist in generating more personalized responses, incorporating lengthy structured context into the plain text input to an LLM is computationally inefficient during inference.

SUMMARY

One aspect of the disclosure provides a computer-implemented method that when executed on data processing hardware causes the data processing hardware to perform operations that include receiving a textual prompt from a user specifying a task for a large language model (LLM) to perform, and obtaining a set of user features associated with the user. The operations also include determining, using the set of user features associated with the user, a user prompt embedding for the user, and processing, using the LLM, the textual prompt conditioned on the user prompt embedding for the user to generate a personalized response to the textual prompt. The operations further include providing the personalized response to the textual prompt for output from a user device associated with the user.

Implementations of the disclosure may include one or more of the following optional features. In some implementations, the set of user features associated with the user includes at least one of a location of the user, an age of the user, a gender of the user. In some examples, the user prompt embedding includes a respective soft prompt configured to guide the LLM to provide personalized responses while parameters of the LLM are held fixed.

In some implementations, determining the user prompt embedding for the user includes processing the set of user features associated with the user to identify a corresponding user category for the user. The corresponding user category is identified from among a plurality of possible user categories each associated with a respective fine-tuned user prompt embedding. Here, the operations also include assigning, as the user prompt embedding determined for the user, the respective fine-tuned user prompt embedding associated with the corresponding user category identified for the user. In these implementations, the respective fine-tuned user prompt embedding associated with the corresponding user category may include a respective soft prompt embedding configured to guide the LLM to provide personalized responses for users within the corresponding user category while parameters of the LLM are held fixed. Here, a respective soft prompt embedding associated with each of the plurality of possible user categories may be configured to guide the LLM to provide a different personalized response to a same textual prompt. In these implementations, each respective fine-tuned user prompt embedding may be learned during a clustered embedding fine-tuning process that includes obtaining a training dataset of training tasks. Each training task includes a corresponding training textual prompt specifying a particular task for the LLM to perform, a corresponding ground-truth response paired with the corresponding training textual prompt, and a respective set of training user features associated with a corresponding training user that issued the training task. These implementations further include, for each training task in the training data set, classifying the training user into one of the plurality of possible user categories based on the respective set of training user features associated with the corresponding training user, each of the plurality of possible user categories assigned a respective user prompt embedding, processing, using the LLM, the corresponding training textual prompt to generate a corresponding predicted response as output from the LLM, determining a training loss based on the corresponding predicted response and the corresponding ground-truth response paired with the corresponding training textual prompt, and fine-tuning, using the training loss, the respective user prompt embedding assigned to the user category the training user is classified into while parameters of the LLM are kept fixed.

In some examples, determining the user prompt embedding for the user includes processing, using a user prompt embedding model, the set of user features associated with the user to predict a respective soft user prompt embedding for the user, and assigning, as the user prompt embedding determined for the user, the respective soft user prompt embedding predicted for the user. In these examples, the set of user features associated with the user may include personal information specific to the user, and the respective soft user prompt embedding predicted for the user may be encrypted. Additionally or alternatively, the user prompt embedding model is trained to learn how to predict soft user prompt embeddings during a user embedding model training process by sampling, from a plurality of sample users, a training dataset of training tasks. Here, each training task includes a corresponding training textual prompt specifying a particular task for the LLM to perform, a corresponding ground-truth response paired with the corresponding training textual prompt, and a respective set of training user features associated with a corresponding one of the sample users that issued the training task. These examples further include, for each training task in the training data set, determining a respective user prompt embedding for the corresponding sample user that issued the training task, processing, using the LLM, the corresponding training textual prompt to generate a corresponding predicted personalized response as output from the LLM, determining a training loss based on the corresponding predicted response and the corresponding ground-truth response paired with the corresponding training textual prompt, and tuning, using the training loss, the respective user prompt embedding determined for the user while parameters of the LLM are kept fixed. Here, for each corresponding sample user of the plurality of sampled users, the operations further include training the user prompt embedding model on the respective set of training user features associated with the corresponding sample user to teach the user prompt embedding model to learn how to predict the respective tuned user prompt embedding determined for the user.

In some implementations, the operations further include receiving local context associated with the textual prompt, and augmenting the textual prompt by concatenating the textual prompt with the local context and the user prompt embedding. Here, processing the textual prompt conditioned on the user prompt embedding includes processing, using the LLM, the concatenation of the local context, the textual prompt, and the user prompt embedding to generate the personalized response to the textual prompt. In these implementations, the local context may be concatenated in plain text with the textual prompt and the user prompt embedding. Additionally or alternatively, the local context may include at least one of a recent activity history including previous queries during a dialog session, geographical location data, and/or site visits, recent documents from a private corpus, recent user history information associated with the textual prompt, or personalized results associated with the textual prompt. In these implementations, the operations may further include determining that access to a particular personal repository containing personal data of the user is required by the LLM to fulfill performance of the task specified by the textual prompt, and generating, by the LLM, a search query specifying the personal data of the user. The search query includes a special token that identifies the particular personal repository containing the personal data. These operations further include requesting, using the search query generated by the LLM, the particular personal repository to return the personal data specified by the search query, where the received local context associated with the textual prompt includes the personal data returned from the particular personal repository.

Another aspect of the disclosure provides a system including data processing hardware and memory hardware in communication with the data processing hardware. The memory hardware stores instructions that when executed by the data processing hardware cause the data processing hardware to perform operations that include receiving a textual prompt from a user specifying a task for a large language model (LLM) to perform, and obtaining a set of user features associated with the user. The operations also include determining, using the set of user features associated with the user, a user prompt embedding for the user, and processing, using the LLM, the textual prompt conditioned on the user prompt embedding for the user to generate a personalized response to the textual prompt. The operations further include providing the personalized response to the textual This aspect may include one or more of the following optional features. In some implementations, the set of user features associated with the user includes at least one of a location of the user, an age of the user, a gender of the user. In some examples, the user prompt embedding includes a respective soft prompt configured to guide the LLM to provide personalized responses while parameters of the LLM are held fixed.

In some implementations, determining the user prompt embedding for the user includes processing the set of user features associated with the user to identify a corresponding user category for the user. The corresponding user category is identified from among a plurality of possible user categories each associated with a respective fine-tuned user prompt embedding. Here, the operations also include assigning, as the user prompt embedding determined for the user, the respective fine-tuned user prompt embedding associated with the corresponding user category identified for the user. In these implementations, the respective fine-tuned user prompt embedding associated with the corresponding user category may include a respective soft prompt embedding configured to guide the LLM to provide personalized responses for users within the corresponding user category while parameters of the LLM are held fixed. Here, a respective soft prompt embedding associated with each of the plurality of possible user categories may be configured to guide the LLM to provide a different personalized response to a same textual prompt. In these implementations, each respective fine-tuned user prompt embedding may be learned during a clustered embedding fine-tuning process that includes obtaining a training dataset of training tasks. Each training task includes a corresponding training textual prompt specifying a particular task for the LLM to perform, a corresponding ground-truth response paired with the corresponding training textual prompt, and a respective set of training user features associated with a corresponding training user that issued the training task. These implementations further include, for each training task in the training data set, classifying the training user into one of the plurality of possible user categories based on the respective set of training user features associated with the corresponding training user, each of the plurality of possible user categories assigned a respective user prompt embedding, processing, using the LLM, the corresponding training textual prompt to generate a corresponding predicted response as output from the LLM, determining a training loss based on the corresponding predicted response and the corresponding ground-truth response paired with the corresponding training textual prompt, and fine-tuning, using the training loss, the respective user prompt embedding assigned to the user category the training user is classified into while parameters of the LLM are kept fixed.

In some examples, determining the user prompt embedding for the user includes processing, using a user prompt embedding model, the set of user features associated with the user to predict a respective soft user prompt embedding for the user, and assigning, as the user prompt embedding determined for the user, the respective soft user prompt embedding predicted for the user. In these examples, the set of user features associated with the user may include personal information specific to the user, and the respective soft user prompt embedding predicted for the user may be encrypted. Additionally or alternatively, the user prompt embedding model is trained to learn how to predict soft user prompt embeddings during a user embedding model training process by sampling, from a plurality of sample users, a training dataset of training tasks. Here, each training task includes a corresponding training textual prompt specifying a particular task for the LLM to perform, a corresponding ground-truth response paired with the corresponding training textual prompt, and a respective set of training user features associated with a corresponding one of the sample users that issued the training task. These examples further include, for each training task in the training data set, determining a respective user prompt embedding for the corresponding sample user that issued the training task, processing, using the LLM, the corresponding training textual prompt to generate a corresponding predicted personalized response as output from the LLM, determining a training loss based on the corresponding predicted response and the corresponding ground-truth response paired with the corresponding training textual prompt, and tuning, using the training loss, the respective user prompt embedding determined for the user while parameters of the LLM are kept fixed. Here, for each corresponding sample user of the plurality of sampled users, the operations further include training the user prompt embedding model on the respective set of training user features associated with the corresponding sample user to teach the user prompt embedding model to learn how to predict the respective tuned user prompt embedding determined for the user.

In some implementations, the operations further include receiving local context associated with the textual prompt, and augmenting the textual prompt by concatenating the textual prompt with the local context and the user prompt embedding. Here, processing the textual prompt conditioned on the user prompt embedding includes processing, using the LLM, the concatenation of the local context, the textual prompt, and the user prompt embedding to generate the personalized response to the textual prompt. In these implementations, the local context may be concatenated in plain text with the textual prompt and the user prompt embedding. Additionally or alternatively, the local context may include at least one of a recent activity history including previous queries during a dialog session, geographical location data, and/or site visits, recent documents from a private corpus, recent user history information associated with the textual prompt, or personalized results associated with the textual prompt. In these implementations, the operations may further include determining that access to a particular personal repository containing personal data of the user is required by the LLM to fulfill performance of the task specified by the textual prompt, and generating, by the LLM, a search query specifying the personal data of the user. The search query includes a special token that identifies the particular personal repository containing the personal data. These operations further include requesting, using the search query generated by the LLM, the particular personal repository to return the personal data specified by the search query, where the received local context associated with the textual prompt includes the personal data returned from the particular personal repository.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Large language models (LLMs) that generate text in response to a user input are becoming increasingly popular as generative artificial intelligence (AI) grows in popularity. Certain LLMs are trained to provide generic template responses, however these responses fall short of incorporating context of the user, and instead provide the same output to all users. While including context into an LLM prompt may assist in generating more personalized responses to users, incorporating lengthy structured context into the plain text input to an LLM is computationally inefficient during inference. Moreover, fully retraining an LLM for individual users or groups of users borders on unfeasible given that each LLM may include billions of parameters.

Given the role that LLMs play in authorship of content, corporate and personal communication, pieces of written content, and synthesis of information from sources with varying degrees of relevance, the ability of the LLM to produce unique/tailored responses that address the voice and context of the user is critical for developing generative AI systems that support particular audiences, creators, and information needs. By including LLMs that take into account the personal (and other) context in which the LLM is expected to be used, the LLM can provide privacy-preserving, personalized responses to user inputs that address multiple personalized information needs for the user, rather than a standard/generic template response.

Figure 1A:
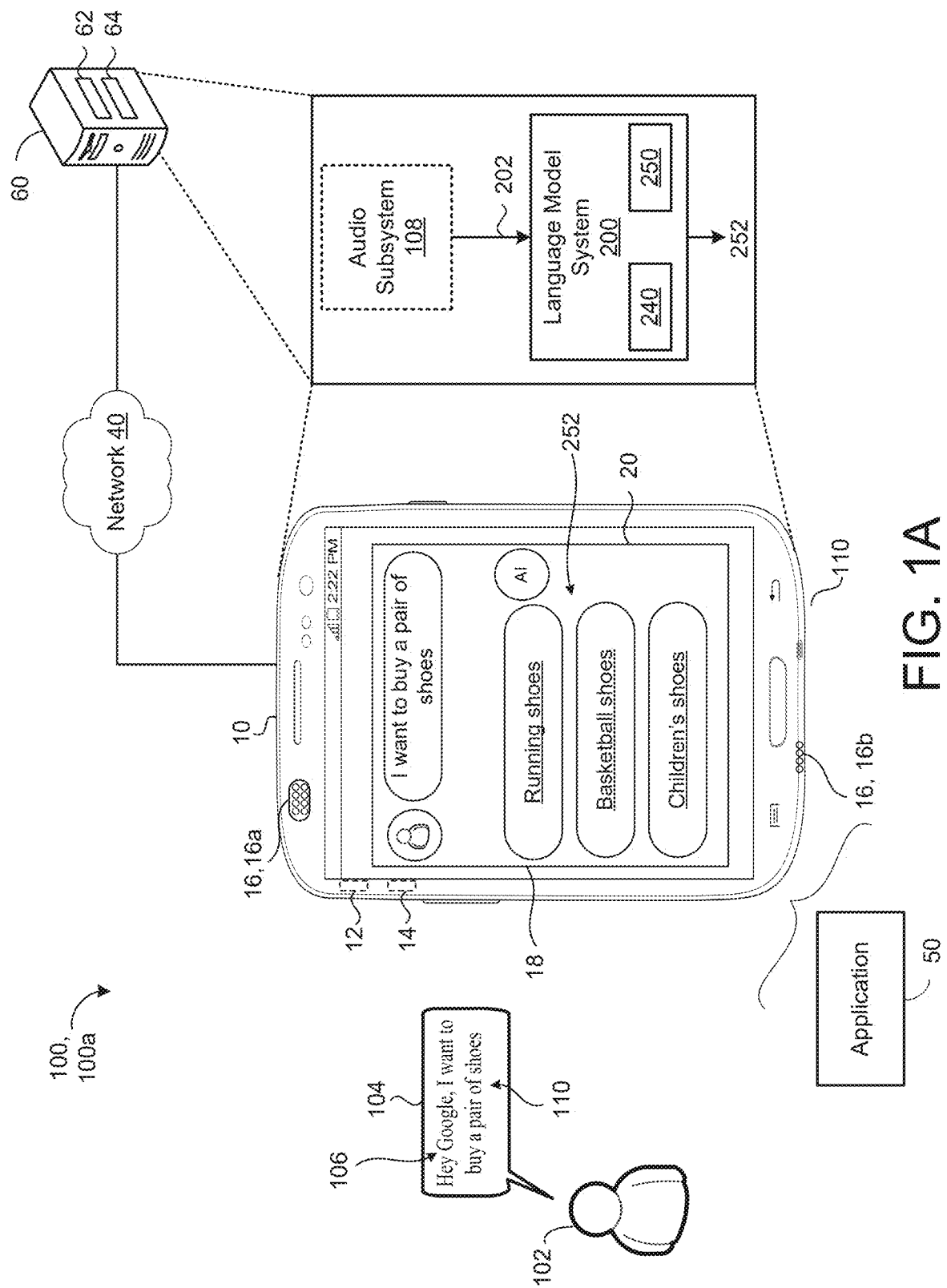
FIGS. 1A-1C are example environments using a large scale, privacy-preserving personalized large language model (LLM) system.
Figure 1B:
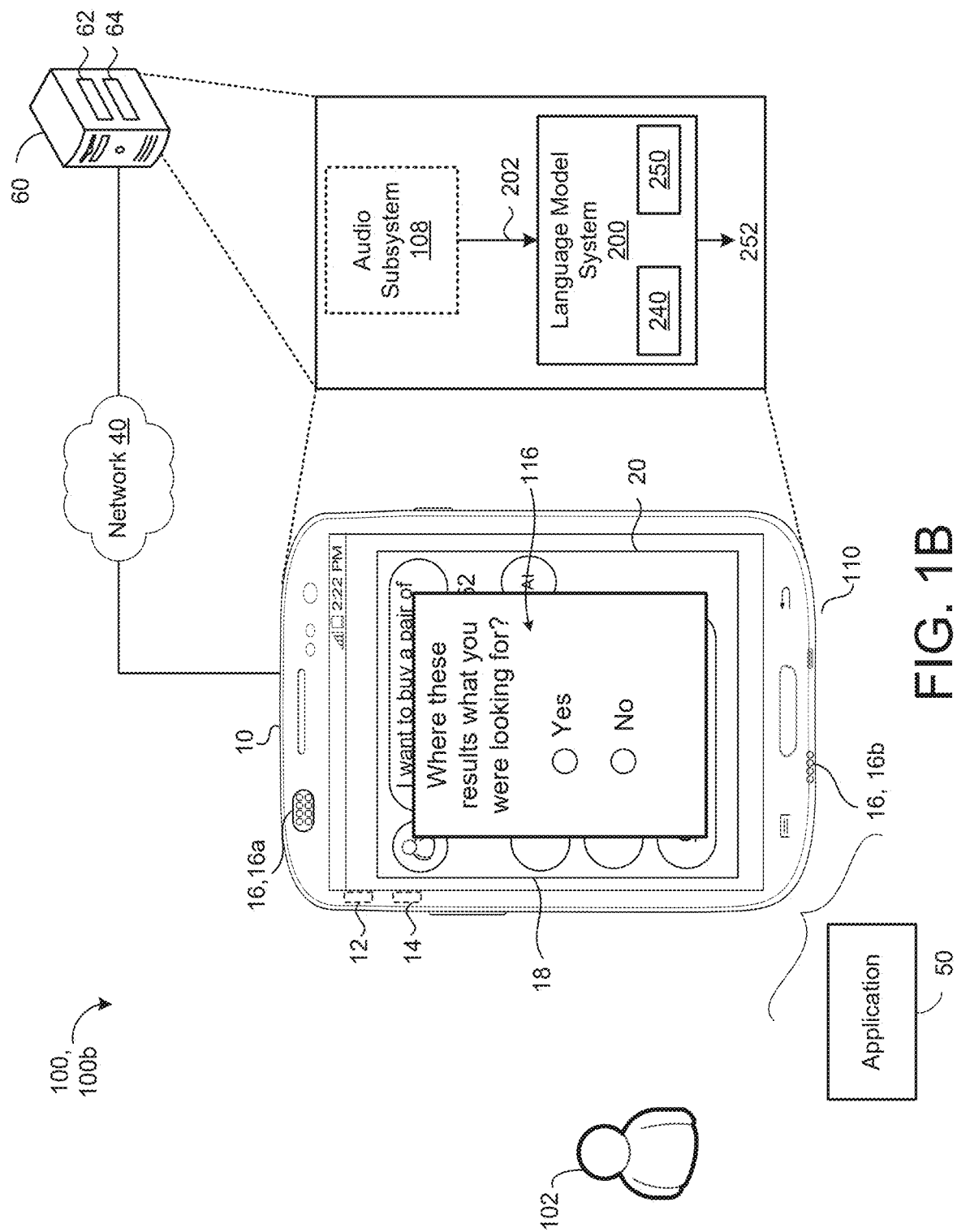
Figure 1C:
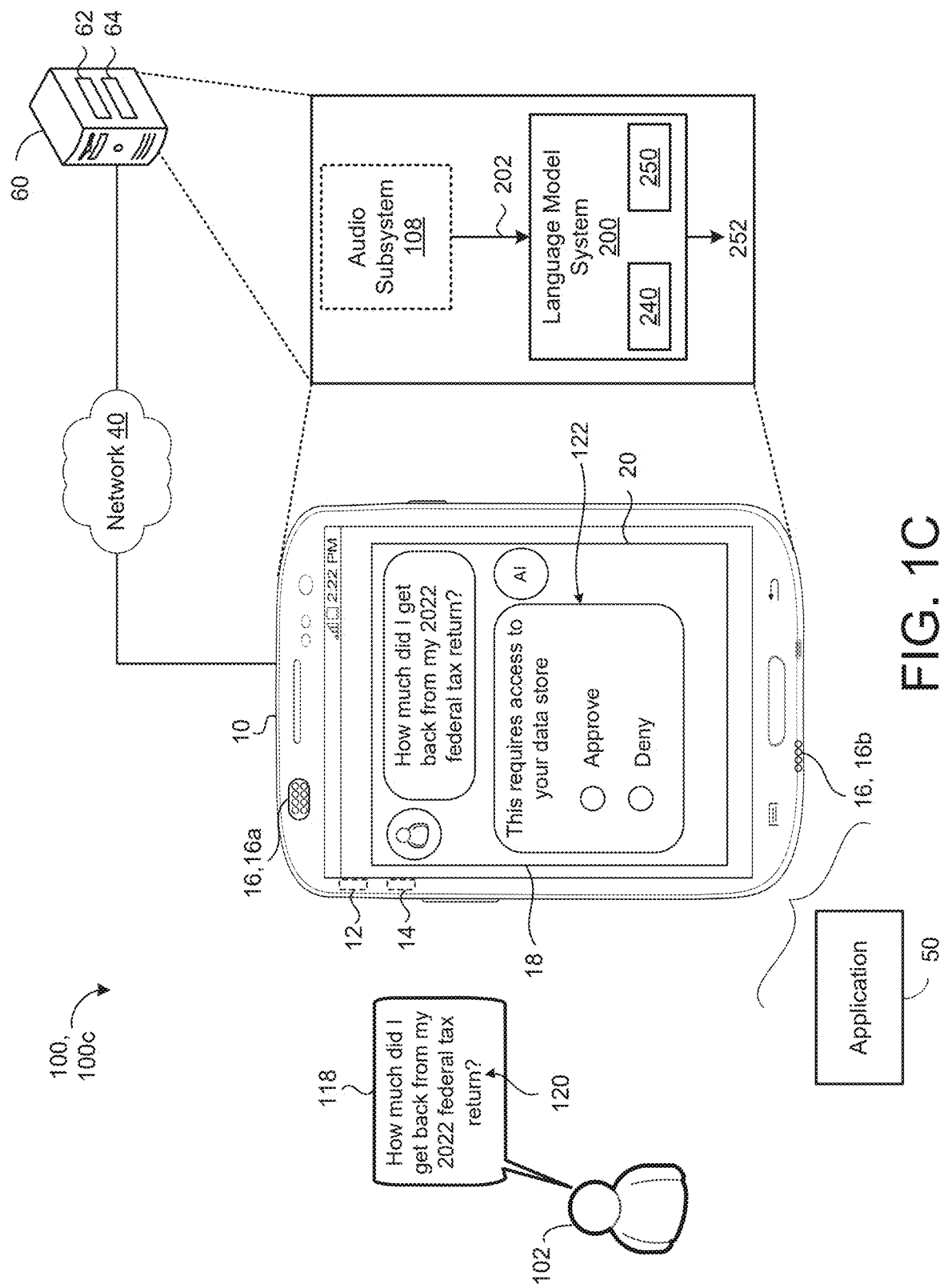

FIGS. 1A-1C are example systems 100, 100a-c each including a user device 10 and/or a remote system 60 in communication with the user device 10 via a network 40. The user device 10 and/or the remote system 60 executes a language model system 200 that a user 102 may interact with through speech, textual inputs, and/or spatial inputs such that the language model system 200 is capable of generating personalized responses to textual prompts 202 specifying a task for a large langue model (LLM) 240 of the language model system 200 to perform.

In the example shown, the user device 10 corresponds to a smart phone, however the user device 10 can include other computing devices having, or in communication with, display screens, such as, without limitation, a tablet, smart display, desktop/laptop, smart watch, smart appliance, smart glasses/headset, or vehicle infotainment device. The user device 10 includes data processing hardware 12 and memory hardware 14 storing instructions that when executed on the data processing hardware 12 cause the data processing hardware 12 to perform operations. The remote system 60 (e.g., server, cloud computing environment) also includes data processing hardware 62 and memory hardware 64 storing instructions that when executed on the data processing hardware 62 cause the data processing hardware 62 to perform operations. As described in greater detail below, the language model system 200 executing on the user device 10 and/or the remote system 60 includes the LLM 240 and a response generator 250, and has access to an embedding data store 220 stored on the memory hardware 14, 64. In some examples, execution of the language model system 200 is shared across the user device 10 and the remote system 60.

The user device 10 further includes an audio system 16 with an audio capture device (e.g., microphone) 16, 16a for capturing and converting spoken utterances 104, 118 within the environment into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16. The user device 10 also executes, for display on a screen 18 in communication with the data processing hardware 12, a graphical user interface (GUI) 20 configured to capture user input indications via any one of touch, gesture, gaze, and/or an input device (e.g., mouse, trackpad, or stylist) for controlling functionality of the user device 10. The GUI 20 may be an interface associated with an application 50 executing on the user device 10 that the user 102 interacts with.

The user device 10 may include an audio subsystem 108 for extracting audio data from an utterance 104, 118 to generate the textual prompt 202. For instance, referring to FIG. 1A, the audio subsystem 108 may receive streaming audio captured by the one or more microphones 16a of the user device 10 that corresponds to an utterance 104 spoken by the user 102 and extract the audio data. The audio data may include acoustic features such as Mel-frequency cepstrum coefficients (MFCCs) or filter bank energies computed over windows of an audio signal. In the example shown, the utterance 104 spoken by the user 102 includes "Hey Google, I want to buy a pair of shoes." In some implementations, rather than issuing a spoken prompt that is converted into the textual prompt 202, the user 102 submits the textual prompt 202 by typing the text (e.g., via an external keyboard in communication with the user device 10 or a graphical element corresponding to a graphical keyboard displayed on in the GUI 20 of the user device 10).

The user device 10 may execute (i.e., on the data processing hardware 12) a hotword detector (not shown) configured to detect a presence of a hotword 106 in streaming audio without performing semantic analysis or speech recognition processing on the streaming audio. The hotword detector may execute on the audio subsystem 108. The hotword detector may receive the audio data to determine whether the utterance 104 includes a particular hotword 106 (e.g., Hey Google) spoken by the user 102. That is, the hotword detector may be trained to detect the presence of the hotword 106 (e.g., Hey Google) or one or more other variants of the hotword (e.g., Ok Google) in the audio data. Detecting the presence of the hotword 106 in the audio data may activate the GUI 20 displayed on the screen 18 to enable the detection of spatial inputs, and activate a speech recognizer of the audio subsystem 108 to perform speech recognition on the audio data corresponding to the utterance 104 of the hotword 106 and/or one or more other terms characterizing the task 110 that follows the hotword. In some examples, the hotword 106 is spoken in the utterance 104 subsequent to the task 110 such the portion of the audio data characterizing the task 110 is buffered and retrieved by the speech recognizer upon detection of the hotword 106 in the audio data. In some implementations, the GUI 20 is activated when the user device 10 receives, in the GUI 20, a user input indication indicating selection of a graphical element (e.g., a graphical microphone). In other implementations, the user device 10 receives a user input indication indicating selection of the physical button disposed on the user device 10. In other implementations, the GUI 20 is activated when the user device 10 detects (e.g., via image and/or radar sensors) a predefined gesture performed by the user 102, or detecting a predefined movement/pose of the user device 10 (e.g., using one or more sensors such as an accelerometer and/or gyroscope). Thereafter, the audio subsystem 108 receives, as input, the audio data corresponding to the utterance 104, and generates/predicts, as output, the textual prompt 202 specifying the task for the language model system 200 (i.e., the LLM 240) to perform.

Figure 2:
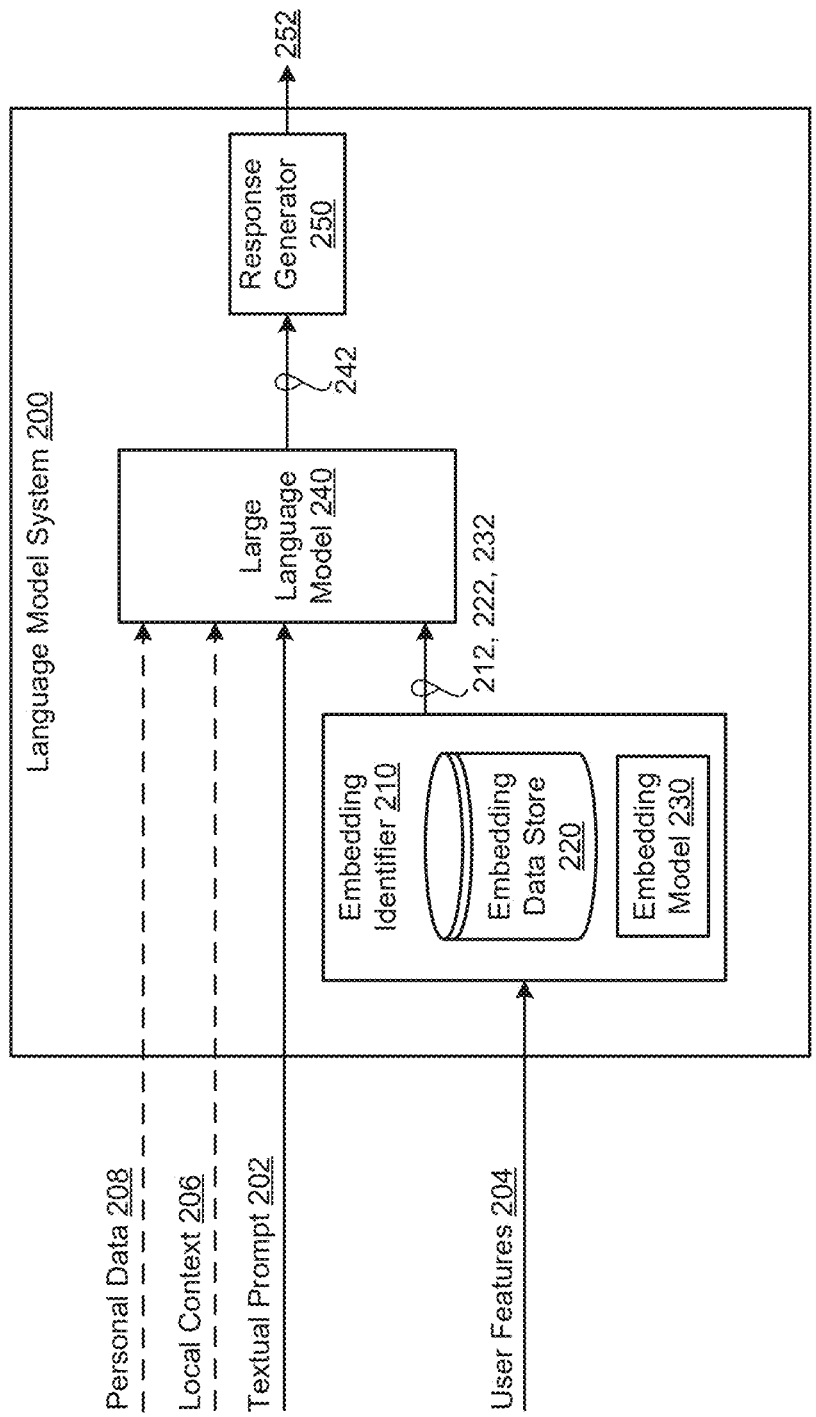
FIG. 2 is a schematic view of example components of the LLM system.

With continued reference to FIG. 1A and FIG. 2, the language model system 200 executes the LLM 240 that receives, as input, the textual prompt 202 and generates, as output, a personalized response 252 to the textual prompt 202. In the example shown, the utterance 104 includes the phrase, "I want to buy a pair of shoes" that requests results for shoes that the user 102 can purchase. In addition to the textual prompt 202, the language model system 200 receives a set of user features 204 associated with the user 102. The set of user features 204 may include any personal context about the user 102 that allows the LLM 240 to generate the personalized response 252 to the textual prompt 202. For example, the set of user features may include at least one of a location of the user 102, an age of the user 102, a gender of the user 102, or a family status (e.g., single, married, and/or kids) of the user 102.

Referring to FIG. 2, the language model system 200 further includes an embedding identifier 210 and a response generator 250. The embedding identifier 210 includes an embedding data store 220 and a prompt embedding model 230 (also referred to as an embedding model 230), and is configured to receive the set of user features 204 associated with the user 102 as input and determine, as output, using the set of user features 204 associated with the user 102, a user prompt embedding 212 for the user 102. Thereafter, the LLM 240 receives the user prompt embedding 212 and conditions the textual prompt 202 on the user prompt embedding 212 for the user 102 to generate the personalized response 252 to the textual prompt 202. The user prompt embedding 212 may include a respective soft prompt embedding configured to guide the LLM 240 to provide personalized responses while parameters of the LLM 240 are held fixed. In the example shown in FIG. 1A, the set of user features 204 associated with the user 102 may identify the user 102 as a dad under the age of 40. As such, the embedding identifier 210 determines/identifies the user prompt embedding 212 that most appropriately aligns with the set of user features 204 associated with the user 102, where the user prompt embedding 212 conditions the textual prompt 202 for the LLM 240 to generate personalized/tailored results for a dad under the age of 40 in the personalized response 252.

In some implementations, the embedding identifier 210 determines the user prompt embedding 212 by processing the set of user features 204 to identify a corresponding user category for the user 102. The corresponding user category is identified from among a plurality of possible user categories each associated with a respective fine-tuned user prompt embedding 222 stored in the embedding data store 220 of the embedding identifier 210. As will be described with more detail below with respect to FIG. 3A, during a training process 300a, the fine-tuned user prompts 222 are pre-learned during a clustered embedding fine-tuning process and are stored in the embedding data store 220 for use during inference. Here, the embedding identifier 210 assigns the respective fine-tuned user prompt embedding 222 associated with the corresponding user category identified for the user 102 as the prompt user embedding 212 determined for the user 102. That is, the embedding data store 220 stores fine-tuned user prompt embeddings 222, where each respective fine-tuned user prompt embedding 222 is associated with a corresponding user category such that the embedding identifier 210 may look up/identify an appropriate fine-tuned user prompt embedding 222 based on the set of user features 204 associated with the user 102. Here, each of the respective fine-tuned user prompt embeddings 222 may include a respective soft prompt embedding configured to guide the LLM 240 to provide the personalized response 252 to the user 102 while parameters of the LLM 240 are held fixed.

In some examples, the respective soft prompt embedding associated with each of the plurality of possible user categories is configured to guide the LLM 240 to provide a different personalized response 252 to a same textual prompt. In this respect, each user category is associated with a different type of user (e.g., represented by the soft prompt embedding), such that the LLM 240 will generate a different response to same textual prompt for each user category. For example, the LLM 240 may generate a different personalized response 252 to the same textual prompt 202 "I want to buy a pair of shoes" submitted by a 27 year old woman and a 40 year old dad.

In other implementations, the embedding identifier 210 determines the user prompt embedding 212 for the user 102 by processing, using the user prompt embedding model 230, the set of user features 204 associated with the user 102 to predict a respective soft user prompt embedding 232 for the user 102. The embedding identifier 210 may then assign the respective soft user prompt embedding 232 predicted for the user 102 as the user prompt embedding 212 determined for the user 102. As will be described with more detail below with respect to FIG. 3B, during a training process 300b, the user prompt embedding model 230 is trained to learn how to predict soft user prompt embeddings 232 during inference. Because the user prompt embedding model 230 predicts the respective soft user prompt embedding 232 assigned to the user prompt embedding 212 for the individual user 102 rather than looking up a fine-tuned user prompt 222, the user prompt embedding 212 is more finely tailored to the user 102. Here, the set of user features 204 received by the embedding identifier 210 may include personal information specific to the user 102. The personal information specific to the user 102 may include emails, text from open documents on the user device 10, and other fine-grain information about the user 102. The personal information specific to the user 102 may be conditioned on the user 102 granting consent of the use of the personal information, and may be encrypted to better protect the privacy of the user 102. As will be des Once the LLM 240 generates the personalized response 252 to the textual prompt 202, the response generator 250 may generate/provide the personalized response 252 to the textual prompt 202 as a textual representation. Here, the user device 10 displays the personalized response 252 in the GUI 20 for the user 102 to review. In the example shown, the response generator 250 generates a textual representation of the personalized response 252 in the form of hyperlinks to types of shoes (i.e., "Running shoes," "Basketball shoes," and "Children's shoes") that are available for sale for display in the GUI 20. In some examples, the response generator 250 employs a text-to-speech (TTS) system (not shown) to convert the textual representation of the personalized response 252 into synthesized speech. In these examples, the response generator 250 generates the synthesized speech for audible output from the speaker 16b of the user device 10 in addition to, or in lieu of, displaying the textual representation of the personalized response 252 in the GUI 20.

Figure 3A:
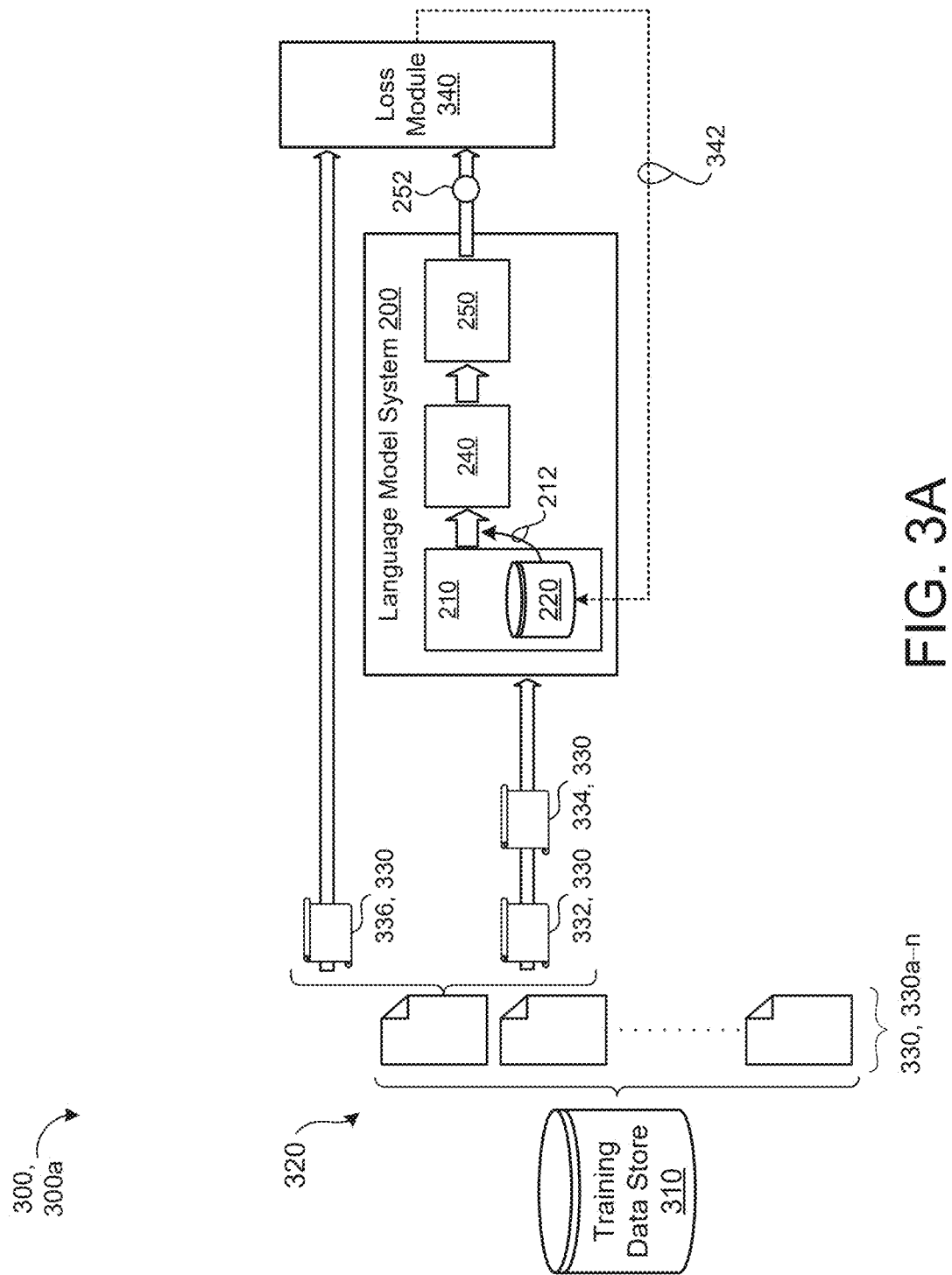
FIG. 3A is a schematic view of an example training processes for fine-tuning user prompt embeddings.

Referring to FIG. 3A, an example training process 300, 300a for fine-tuning user prompts 222 during a clustered embedding fine-tuning process is shown. The training process 300a may execute on the remote system 60 of FIGS. 1A-1C. As shown, the training process 300a obtains one or more training data sets 320 stored in a training data store 310 and trains the language model system 200 on the training data sets 320 to generate the fine-tuned user prompt embeddings 222 stored in the embedding data store 220. The training data store 310 may reside on the memory hardware 64 of the remote system 60. Each training data set 320 includes a plurality of training tasks, 330, 330a-n, where each training task 330 includes a corresponding training textual prompt 332 specifying a particular task for the LLM 240 to perform, a corresponding ground-truth response 336 paired with the corresponding training textual prompt 332, and a respective set of training user features 334 associated with a corresponding training user that issued the training task 330. For each training task 330 in the training dataset 320, the training process 300a classifies the training user into one of the plurality of possible user categories based on the respective set of training user features 334 associated with the corresponding training user, and processes, using the LLM 240, the corresponding training textual prompt 332 to generate a corresponding predicted response 252 as output from the LLM 240. A loss module 340 of the training process 300a receives, as input, the corresponding ground-truth response 336 and the corresponding predicted response 252 and determines a training loss 342 based on the predicted response 252 and the corresponding ground-truth response 336 paired with the corresponding training textual prompt 332. Thereafter, the training process 300a fine-tunes, using the training loss 342, the respective user prompt embedding 212 stored in the embedding data store 220 and assigned to the user category the training user is classified into while parameters of the LLM 240 are kept fixed. By keeping the parameters of the LLM 240 fixed, the user prompt embeddings 212 can be personalized without the computational expense of retraining separate LLMs 240 for each user category.

Figure 3B:
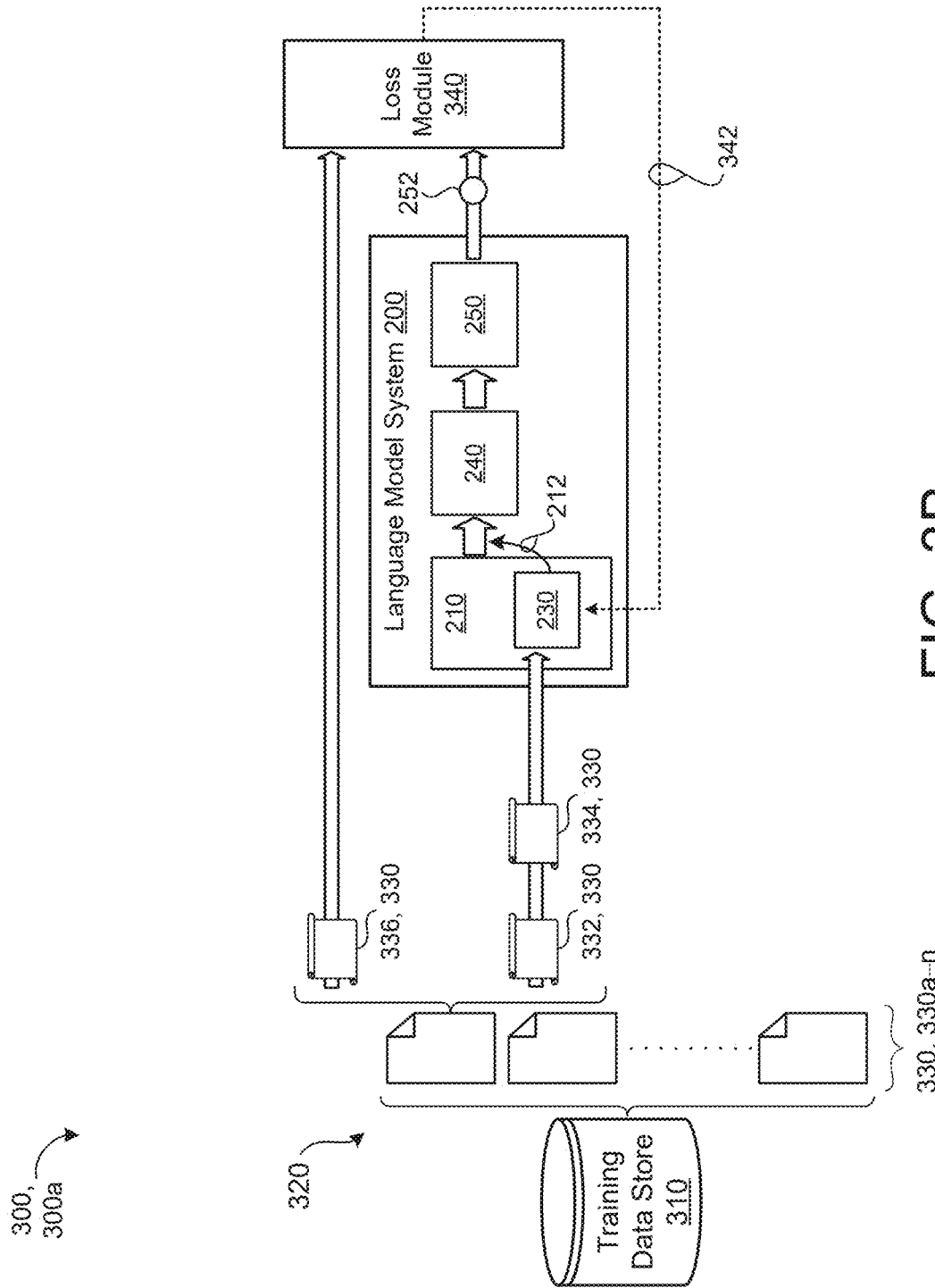
FIG. 3B is a schematic view of an example training process for promoting a user prompt embedding model to learn consistent predictions.

Referring to FIG. 3B, an example training process 300, 300b for training a user prompt embedding model 230 to learn how to predict soft user prompt embeddings 232 during inference is shown. The training process 300b may execute on the remote system 60 of FIGS. 1A-1C. As shown, the training process 300b samples, from a plurality of sample users, a training data set 320 of training tasks 330 stored in a training data store 310 and trains the prompt embedding model 230 of the language model system 200 on the training data set 320 to learn to predict the soft user prompt embeddings 212 for a given user 102 that submits a textual prompt 202 to the language model system 200. The training data store 310 may reside on the memory hardware 64 of the remote system 60. Like in training process 300a, each training data set 320 includes a plurality of training tasks, 330, 330a-n, where each training task 330 includes a corresponding training textual prompt 332 specifying a particular task for the LLM 240 to perform, a corresponding ground-truth response 336 paired with the corresponding training textual prompt 332, and a respective set of training user features 334 associated with a corresponding training user that issued the training task 330. Here, the respective set of training user features 334 may include personal information such as emails, open documents, in addition to category user features such as age, gender, location, family status, etc. For each training task 330 in the training dataset 320, the training process 300b determines a respective user prompt embedding 212 for the corresponding sample user that issued the training task 330. Here, the user prompt embedding 212 may be based on a user category the corresponding sample user is classified into based on the training user features 334. The training process 300b next processes, using the LLM 240, the corresponding training textual prompt 332 to generate a corresponding predicted response 252 as output from the LLM 240. A loss module 340 of the training process 300b receives, as input, the corresponding ground-truth response 336 and the corresponding predicted response 252 and determines a training loss 342 based on the predicted response 252 and the corresponding ground-truth response 336 paired with the corresponding training textual prompt 332. Thereafter, the training process 300b tunes, using the training loss 342, the respective user prompt embedding 212 determined for the sample user while parameters of the LLM 240 are kept fixed. By keeping the parameters of the LLM 240 fixed, the user prompt embeddings 212 can be personalized without the computational expense of retraining separate LLMs 240 for each user category. For each corresponding sample user of the plurality of sample users, the training process 300b trains the user prompt embedding model 230 on the respective set of training user features 334 associated with the corresponding sample user to teach the user prompt embedding model 230 to learn how to predict the respective tuned user prompt embedding 212 determined for the user 102. By using the user prompt embedding model 230 to generate unique tuned user prompt embeddings 212 for each user 102, the personalized response 252 generated based on the soft user prompt embedding 232 for the user 102 may be more accurate than the fine-tuned user prompt embedding 222 assigned to the user 102.

Referring to FIG. 1B, in some implementations, the user prompt embeddings 212 may be continually fine-tuned/updated by reinforcement learning from human feedback during inference. In the example shown, the user device 10 renders/displays a graphical element 116 representing a notification to the user 102 that asks "Where these results what you were looking for?" and includes graphical elements for the user 102 to select "Yes" or "No" to provide human feedback. This feedback may be used to tune the user prompt embedding 212 to ensure that the personalized response 252 for the user 102 stays up to date with the user preferences, experiences, and/or context.

Referring to FIGS. 1C and 2, in some implementations, the LLM 240 receives local context 206 associated with the textual prompt 202 in addition to receiving the textual prompt 202. The LLM 240 may receive the local context 206 in addition to, or in lieu of the set of user features 204. Here, the LLM 240 augments the textual prompt 202 by concatenating the textual prompt 202 with the local context 206 where processing the textual prompt 202 conditioned on the user prompt embedding 212 includes processing, using the LLM 240, the concatenation of the local context 206, the textual prompt 202, and the user prompt embedding 212 to generate the personalized response 252 to the textual prompt 202. Here, the local context 204 may be concatenated in plain text with the textual prompt 202 and the user prompt embedding 212.

The local context 206 may include any previous tasks or queries input to the LLM 240 and may include at least one of a recent activity history including previous queries during a dialog session, geographical location data, and/or site visits by the user 102, recent documents from a private corpus of the user 102, recent user history information associated with the textual prompt 202, or personalized results associated with the textual prompt 202. For example, the user 102 may interact with a personal assistant (e.g., assistant 50) of the user device 10 that uses the LLM 240. In this example, the local context 206 may indicate previous tasks/queries as well as previous responses from the LLM 240. As an example, the user 102 may submit a prompt 202 "tell me about the solar system" to the LLM 240 and, after a response is generated by the LLM 240, the user 102 may submit a follow up prompt 202 of "explain it to me as if I were in first grade." In this example, the local context 206 includes the initial prompt of "tell me about the solar system" so that the LLM 240 has sufficient context for what the user 102 means by "explain it."

In some implementations, the language model 200 determines that access to a particular personal repository containing personal data of the user 102 is required by the LLM 240 to fulfill performance of the task specified by the textual prompt 202. For example, the user 102 may submit a textual prompt 202 that requires the LLM 240 to access a data repository or personal drive that store private documents associated with the user 102. In response to determining that access to the particular personal repository containing personal data of the user is required, the LLM 240 may generate a search query specifying the personal data 208 of the user 102. The search query may include a special token that identifies the particular personal repository containing the personal data 208. Thereafter, the language model 200 requests, using the search query generated by the LLM 240 the particular personal repository to return the personal data 208 specified by the search query. Here, the received local context 206 associated with the textual prompt 202 may include the personal data 208 returned from the particular personal repository.

Referring to FIG. 1C, the user may issue an utterance 118 "How much did I get back from my 2022 federal tax return?" which includes the task 120 for the LLM 240 to identify and report the amount that the user 102 got back in 2022 federal taxes. Here, the LLM 240 processes the textual prompt 202 corresponding to the utterance 118 and determines that access to the user's tax returns is needed to provide the personalized response 252. Here, the user device 10 renders/displays a graphical element 122 representing a notification to the user 102 "This requires access to your data store" and includes graphical elements for the user 102 to select "Approve" or "Deny" before the LLM 240 may proceed with generating the search query. In response to the user 102 selecting the graphical element corresponding to "Approve," the LLM 240 may generate the search query specifying the personal data 208 (i.e., the user's tax 2022 tax return) and including a special token that identifies the particular personal repository that contains the 2022 tax return for the user 102.

Figure 4:
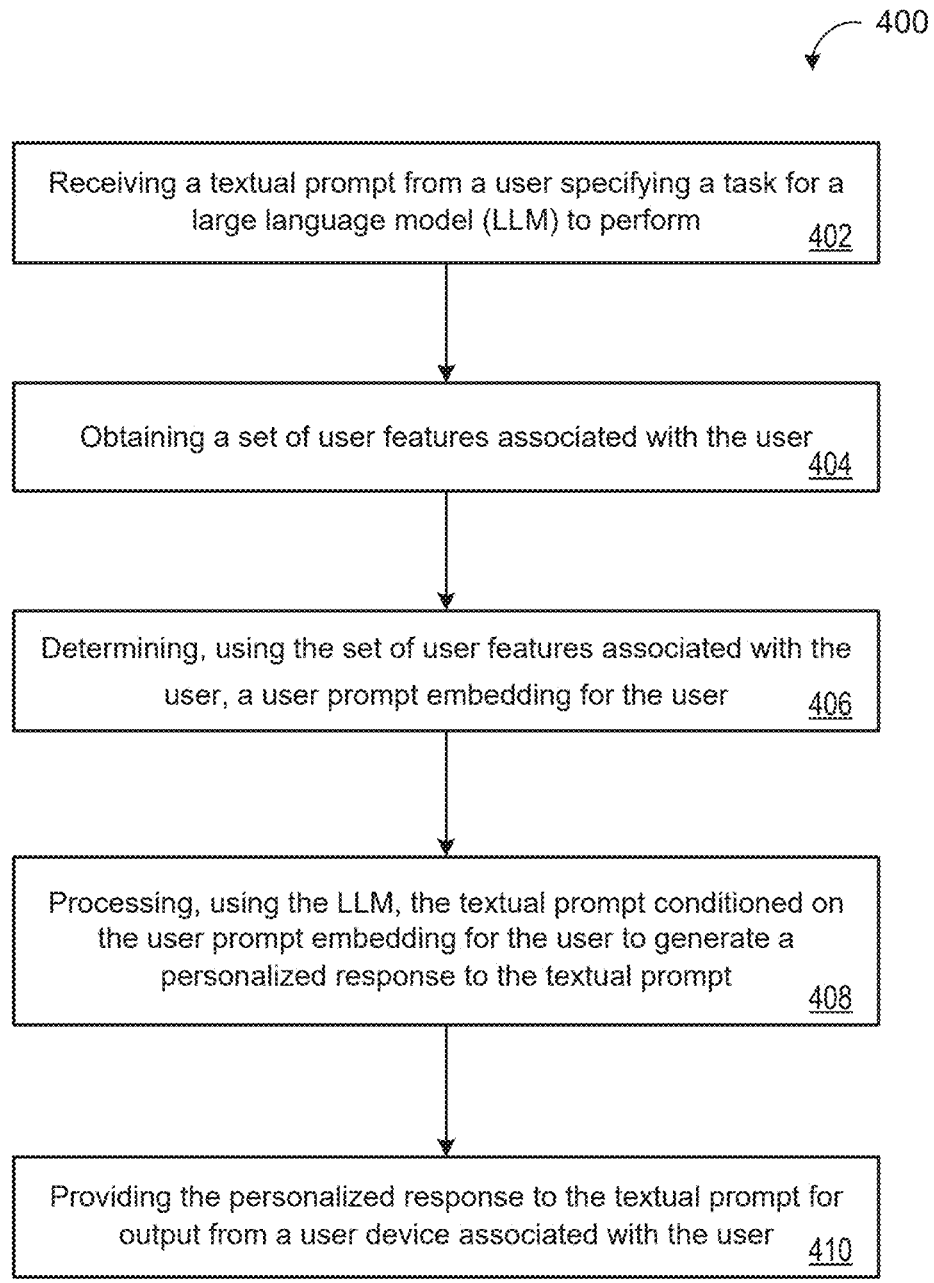
FIG. 4 is a flowchart of an example arrangement of operations for a method of providing personalized responses to textual prompts using the LLM system.

FIG. 4 is a flowchart of an example arrangement of operations for a method 400 of providing personalized responses to textual prompts using a large scale, privacy preserving, large language model (LLM). At operation 402, the method 400 receiving a textual prompt 202 from a user 102 specifying a task for an LLM 240 to perform. At operation 404, the method 400 includes obtaining a set of user features 204 associated with the user 102.

At operation 406, the method 400 includes determining, using the set of user features 204 associated with the user 102, a user prompt embedding 212 for the user 102. The method 400 also includes, at operation 408, processing, using the LLM 240, the textual prompt 202 conditioned on the user prompt embedding 212 for the user 102 to generate a personalized response 252 to the textual prompt 202. At operation 410, the method 400 further includes providing the personalized response 252 to the textual prompt 202 for output from a user device 10 associated with the user 102.

Figure 5:
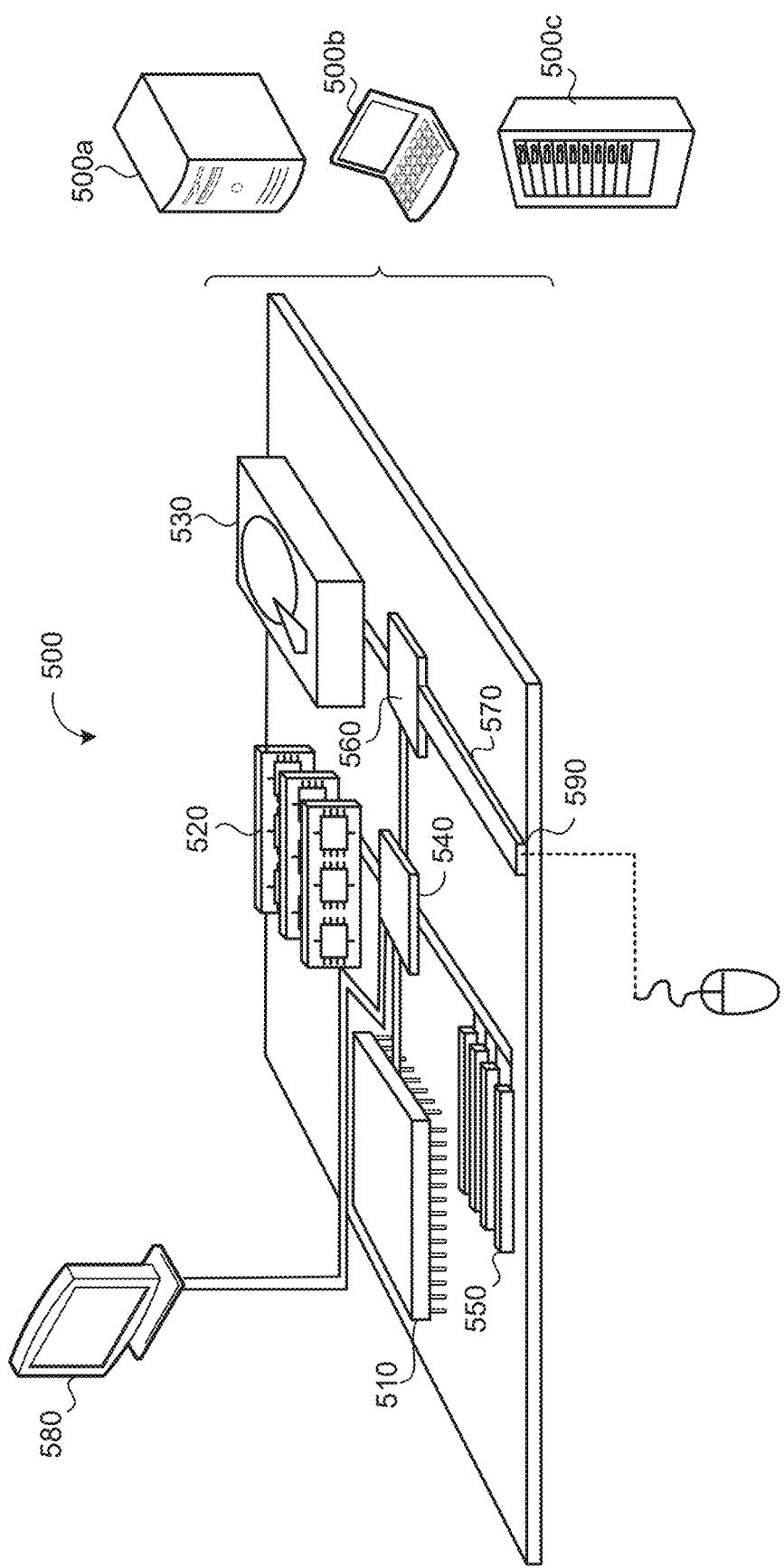
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 (e.g., the data processing hardware 10, 62 of FIGS. 1A-1C) can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 (e.g., the memory hardware 14, 64 of FIGS. 1A-1C) stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
   receiving a textual prompt from a user, the textual prompt corresponding to an utterance of terms input by the user to a user device associated with the user that specifies a task for a large language model (LLM) to perform;
   obtaining a set of user features associated with the user;
   determining, using the set of user features associated with the user, a user prompt embedding for the user;
   processing, using the LLM, the textual prompt conditioned on the user prompt embedding for the user to generate a personalized response to the textual prompt; and
   providing the personalized response to the textual prompt for output from the user device associated with the user.

2. The computer-implemented method of claim 1, wherein the set of user features associated with the user comprises at least one of a location of the user, an age of the user, a gender of the user.

3. The computer-implemented method of claim 1, wherein the user prompt embedding comprises a respective soft prompt configured to guide the LLM to provide personalized responses while parameters of the LLM are held fixed.

4. The computer-implemented method of claim 1, wherein determining the user prompt embedding for the user comprises:
   processing the set of user features associated with the user to identify a corresponding user category for the user, the corresponding user category identified from among a plurality of possible user categories each associated with a respective fine-tuned user prompt embedding; and
   assigning, as the user prompt embedding determined for the user, the respective fine-tuned user prompt embedding associated with the corresponding user category identified for the user.

5. The computer-implemented method of claim 4, wherein the respective fine-tuned user prompt embedding associated with the corresponding user category comprises a respective soft prompt embedding configured to guide the LLM to provide personalized responses for users within the corresponding user category while parameters of the LLM are held fixed.

6. The computer-implemented method of claim 5, wherein a respective soft prompt embedding associated with each of the plurality of possible user categories is configured to guide the LLM to provide a different personalized response to a same textual prompt.

7. The computer-implemented method of claim 4, wherein each respective fine-tuned user prompt embedding is learned during a clustered embedding fine-tuning process by:
   obtaining a training dataset of training tasks, each training task comprising:
      a corresponding training textual prompt specifying a particular task for the LLM to perform;
      a corresponding ground-truth response paired with the corresponding training textual prompt; and
      a respective set of training user features associated with a corresponding training user that issued the training task; and
   for each training task in the training data set:
      classifying the training user into one of the plurality of possible user categories based on the respective set of training user features associated with the corresponding training user, each of the plurality of possible user categories assigned a respective user prompt embedding;
      processing, using the LLM, the corresponding training textual prompt to generate a corresponding predicted response as output from the LLM;
      determining a training loss based on the corresponding predicted response and the corresponding ground-truth response paired with the corresponding training textual prompt; and
      fine-tuning, using the training loss, the respective user prompt embedding assigned to the user category the training user is classified into while parameters of the LLM are kept fixed.

8. The computer-implemented method of claim 1, wherein determining the user prompt embedding for the user comprises:
   processing, using a user prompt embedding model, the set of user features associated with the user to predict a respective soft user prompt embedding for the user; and
   assigning, as the user prompt embedding determined for the user, the respective soft user prompt embedding predicted for the user.

9. The computer-implemented method of claim 8, wherein:
   the set of user features associated with the user comprise personal information specific to the user; and
   the respective soft user prompt embedding predicted for the user is encrypted.

10. The computer-implemented method of claim 8, wherein the user prompt embedding model is trained to learn how to predict soft user prompt embeddings during a user embedding model training process by:
sampling, from a plurality of sample users, a training dataset of training tasks, each training task comprising:
a corresponding training textual prompt specifying a particular task for the LLM to perform;
a corresponding ground-truth response paired with the corresponding training textual prompt; and
a respective set of training user features associated with a corresponding one of the sample users that issued the training task;
for each training task in the training data set:
determining a respective user prompt embedding for the corresponding sample user that issued the training task;
processing, using the LLM, the corresponding training textual prompt to generate a corresponding predicted personalized response as output from the LLM;
determining a training loss based on the corresponding predicted response and the corresponding ground-truth response paired with the corresponding training textual prompt; and
tuning, using the training loss, the respective user prompt embedding determined for the user while parameters of the LLM are kept fixed; and
for each corresponding sample user of the plurality of sampled users, training the user prompt embedding model on the respective set of training user features associated with the corresponding sample user to teach the user prompt embedding model to learn how to predict the respective tuned user prompt embedding determined for the user.

11. The computer-implemented method of claim 1, wherein the operations further comprise:
receiving local context associated with the textual prompt; and
augmenting the textual prompt by concatenating the textual prompt with the local context and the user prompt embedding,
wherein processing the textual prompt conditioned on the user prompt embedding comprises processing, using the LLM, the concatenation of the local context, the textual prompt, and the user prompt embedding to generate the personalized response to the textual prompt.

12. The computer-implemented method of claim 11, wherein the local context is concatenated in plain text with the textual prompt and the user prompt embedding.

13. The computer-implemented method of claim 11, wherein the local context comprises at least one of:
a recent activity history comprising previous queries during a dialog session, geographical location data, and/or site visits;
recent documents from a private corpus;
recent user history information associated with the textual prompt; or personalized results associated with the textual prompt.

14. The computer-implemented method of claim 11, wherein the operations further comprise:
determining that access to a particular personal repository containing personal data of the user is required by the LLM to fulfill performance of the task specified by the textual prompt;
generating, by the LLM, a search query specifying the personal data of the user, the search query comprising a special token that identifies the particular personal repository containing the personal data; and
requesting, using the search query generated by the LLM, the particular personal repository to return the personal data specified by the search query,
wherein the received local context associated with the textual prompt comprises the personal data returned from the particular personal repository.

15. A system comprising:
data processing hardware; and
memory hardware in communication with the data processing hardware, the memory hardware storing instructions that when executed on the data processing hardware cause the data processing hardware to perform operations comprising:
receiving a textual prompt from a user, the textual prompt corresponding to an utterance of terms input by the user to a user device associated with the user that specifies a task for a large language model (LLM) to perform;
obtaining a set of user features associated with the user;
determining, using the set of user features associated with the user, a user prompt embedding for the user;
processing, using the LLM, the textual prompt conditioned on the user prompt embedding for the user to generate a personalized response to the textual prompt; and
providing the personalized response to the textual prompt for output from a user device associated with the user.

16. The system of claim 15, wherein the set of user features associated with the user comprises at least one of a location of the user, an age of the user, a gender of the user.

17. The system of claim 15, wherein the user prompt embedding comprises a respective soft prompt configured to guide the LLM to provide personalized responses while parameters of the LLM are held fixed.

18. The system of claim 15, wherein determining the user prompt embedding for the user comprises:
processing the set of user features associated with the user to identify a corresponding user category for the user, the corresponding user category identified from among a plurality of possible user categories each associated with a respective fine-tuned user prompt embedding; and
assigning, as the user prompt embedding determined for the user, the respective fine-tuned user prompt embedding associated with the corresponding user category identified for the user.

19. The system of claim 18, wherein the respective fine-tuned user prompt embedding associated with the corresponding user category comprises a respective soft prompt embedding configured to guide the LLM to provide personalized responses for users within the corresponding user category while parameters of the LLM are held fixed.

20. The system of claim 19, wherein a respective soft prompt embedding associated with each of the plurality of possible user categories is configured to guide the LLM to provide a different personalized response to a same textual prompt.

21. The system of claim 18, wherein each respective fine-tuned user prompt embedding is learned during a clustered embedding fine-tuning process by:
obtaining a training dataset of training tasks, each training task comprising:
a corresponding training textual prompt specifying a particular task for the LLM to perform;
a corresponding ground-truth response paired with the corresponding training textual prompt; and a respective set of training user features associated with a corresponding training user that issued the training task; and for each training task in the training data set:
classifying the training user into one of the plurality of possible user categories based on the respective set of training user features associated with the corresponding training user, each of the plurality of possible user categories assigned a respective user prompt embedding;

processing, using the LLM, the corresponding training textual prompt to generate a corresponding predicted response as output from the LLM;

determining a training loss based on the corresponding predicted response and the corresponding ground-truth response paired with the corresponding training textual prompt; and fine-tuning, using the training loss, the respective user prompt embedding assigned to the user category the training user is classified into while parameters of the LLM are kept fixed.

22. The system of claim 15, wherein determining the user prompt embedding for the user comprises:
processing, using a user prompt embedding model, the set of user features associated with the user to predict a respective soft user prompt embedding for the user; and
assigning, as the user prompt embedding determined for the user, the respective soft user prompt embedding predicted for the user.

23. The system of claim 22, wherein:
the set of user features associated with the user comprise personal information specific to the user; and
the respective soft user prompt embedding predicted for the user is encrypted.

24. The system method of claim 22, wherein the user prompt embedding model is trained to learn how to predict soft user prompt embeddings during a user embedding model training process by:
sampling, from a plurality of sample users, a training dataset of training tasks, each training task comprising:
a corresponding training textual prompt specifying a particular task for the LLM to perform;
a corresponding ground-truth response paired with the corresponding training textual prompt; and
a respective set of training user features associated with a corresponding one of the sample users that issued the training task;

for each training task in the training data set:
determining a respective user prompt embedding for the corresponding sample user that issued the training task;
processing, using the LLM, the corresponding training textual prompt to generate a corresponding predicted personalized response as output from the LLM;
determining a training loss based on the corresponding predicted response and the corresponding ground-truth response paired with the corresponding training textual prompt; and
tuning, using the training loss, the respective user prompt embedding determined for the user while parameters of the LLM are kept fixed; and for each corresponding sample user of the plurality of sampled users, training the user prompt embedding model on the respective set of training user features associated with the corresponding sample user to teach the user prompt embedding model to learn how to predict the respective tuned user prompt embedding determined for the user.

25. The system of claim 15, wherein the operations further comprise:
receiving local context associated with the textual prompt; and
augmenting the textual prompt by concatenating the textual prompt with the local context and the user prompt embedding,
wherein processing the textual prompt conditioned on the user prompt embedding comprises processing, using the LLM, the concatenation of the local context, the textual prompt, and the user prompt embedding to generate the personalized response to the textual prompt.

26. The system of claim 25, wherein the local context is concatenated in plain text with the textual prompt and the user prompt embedding.

27. The system of claim 25, wherein the local context comprises at least one of:
a recent activity history comprising previous queries during a dialog session, geographical location data, and/or site visits;
recent documents from a private corpus;
recent user history information associated with the textual prompt; or personalized results associated with the textual prompt.

28. The system of claim 25, wherein the operations further comprise:
determining that access to a particular personal repository containing personal data of the user is required by the LLM to fulfill performance of the task specified by the textual prompt;
generating, by the LLM, a search query specifying the personal data of the user, the search query comprising a special token that identifies the particular personal repository containing the personal data; and
requesting, using the search query generated by the LLM, the particular personal repository to return the personal data specified by the search query,
wherein the received local context associated with the textual prompt comprises the personal data returned from the particular personal repository.

* * * * *